United States Patent
York (10) Patent No.: US 9,280,354 B1
(45) Date of Patent: Mar. 8, 2016

(54) INTERVAL TIMER (75) Inventor: William Harold York, Hopedale, MA (US)

(73) Assignee: The MathWorks, Inc., Natick, MA (US)

(*) Notice: Subject to any disclaimer, the term of this patent is extended or adjusted under 35 U.S.C. 154(b) by 431 days.

(21) Appl. No.: 13/479,490

(22) Filed: May 24, 2012

Related U.S. Application Data (60) Provisional application No. 61/567,949, filed on Dec. 7, 2011.

(51) Int. Cl.
*G06F 9/44* (2006.01)

(52) U.S. Cl.
CPC .......................... *G06F 9/44* (2013.01)

(58) Field of Classification Search
CPC ........................................ G06F 9/3851
USPC .................................................. 713/502
See application file for complete search history.

(56) References Cited

U.S. PATENT DOCUMENTS

| | | | |
|---|---|---|---|
| 2007/0195826 A1* | 8/2007 | Wang et al. | 370/498 |
| 2008/0109785 A1* | 5/2008 | Bailey | 717/109 |
| 2011/0045789 A1* | 2/2011 | Sinton et al. | 455/127.1 |
| 2011/0061062 A1* | 3/2011 | Chu et al. | 719/314 |
| 2012/0020675 A1* | 1/2012 | Chuang et al. | 398/193 |

OTHER PUBLICATIONS

Oaks, Scott, and Henry Wong. 2004. Java Threads. 3rd Edition. Sebastopol, CA: O'Reilly & Associates, 2009. Chapters 3 and 11.*

* cited by examiner

*Primary Examiner* — Paul Yanchus, III
*Assistant Examiner* — Joshua Neveln
(74) *Attorney, Agent, or Firm* — Finnegan, Henderson, Farabow, Garrett & Dunner, LLP

(57) ABSTRACT

Methods and systems for implementing multi-rate programs and in particular for implementing interval timers for multi-rate programs are disclosed. In some embodiments, a method of executing an interval timer is performed by one or more computer processors. The method comprises starting the interval timer, wherein starting the interval timer includes starting a stop-watch and setting a value of a Boolean flag to false. Further, the method comprises setting the value of the Boolean flag to true when the stop-watch reaches a preset time-interval value. The method also comprises, whenever the interval timer is invoked, returning the value of the Boolean flag and, if the returned value of the Boolean flag is true, restarting the stop-watch and setting the value of the Boolean flag to false. In some embodiments, the method further comprises stopping the stop-watch when the stop-watch reaches the preset time-interval value.

18 Claims, 4 Drawing Sheets

INTERVAL TIMER

RELATED APPLICATIONS

This application claims priority under 35 U.S.C. §119 to U.S. Provisional Patent Application No. 61/567,949, which was filed on Dec. 7, 2011, and is herein incorporated by reference in its entirety.

TECHNICAL FIELD

The present disclosure relates generally to methods and systems for implementing multi-rate programs and in particular for implementing interval timers for multi-rate programs.

BACKGROUND

Software programs often require executing various operations that execute at different speeds or use different amounts of computer resources. Moreover, in some programs, one set of operations use the results of another set of operations. In some cases, a program performs a set of iterative operations and repeatedly outputs the results of the iterations to another operation. For example, some programs execute a set of calculations in a repetitive loop and the results of those calculations are iteratively used by a set of drawing operations which refreshes a drawing of those results. Some other programs can feed the results of the iterative calculations to an output program to, for example, display or print the results. A high level example of such an iterative program is shown in code (1).
Code (1)
data=initialize_data( );
for i=1, loop_count
   % perform calculations here
   updated_data=calculate(data);
   % perform drawing here
   draw(updated_data);
   data=updated_data;
end
In code (1), after initiating data, a loop runs over the index i. In each iteration of the loop, a calculate( ) function calculates some updated data and a draw( ) function draws the updated data. Code (1), in particular, satisfies sequential locality of reference for updated_data, in that the draw( ) function always uses updated_data after the calculate( ) function has completed calculating the updated_date. Therefore, the state of the updated_data, when used by draw( ) is predictable.

Various operations may run at different speeds and the user may not need to apply the results of a first operation to a second operation in every iteration. For example, in code (1), in each iteration the calculation operation calculate( ) may only take a few microseconds to update the data, but the draw( ) operation may take a few seconds to draw the updated data on a screen. Moreover, the user may only need to draw the results once every ten seconds and not for every updated calculation. Thus, including all operations in a loop and without any constraints on when each operation should be executed, as in the example of code (1), may slow down the faster operations, here the calculations, for the sake of unnecessarily running in each iteration the slower operation, here drawing the updated data. On the other hand, the user may still need to repeat the slower operation, here the drawing, albeit not as often as the calculations.

SUMMARY

In some embodiments, a method of executing an interval timer is performed by one or more computer processors. The method comprises starting the interval timer by the one or more computer processors, wherein starting the interval timer comprises starting a stop-watch and setting a value of a Boolean flag to false; when the stop-watch reaches a preset time-interval value, setting the value of the Boolean flag to true; and whenever the interval timer is invoked, returning, by the one or more computer processors, the value of the Boolean flag and, if the returned value of the Boolean flag is true, restarting the stop-watch and setting the value of the Boolean flag to false.

In some embodiments, the method further comprises stopping the stop-watch when the stop-watch reaches the preset time-interval value. Moreover, in some embodiments, the method further comprises running a first thread and a second thread different from the first thread, wherein the first thread executes a program that invokes the interval timer and the second thread performs one or more of starting the stop-watch, stopping the stop-watch, and setting the Boolean flag.

In some embodiments, the interval timer is invoked as part of executing a functional, wherein an argument of the functional comprises one or more functions, and wherein executing the functional comprises if the interval timer has not been invoked before, starting the interval timer; and otherwise, if the interval timer has been invoked before, invoking the interval timer, receiving the value of the Boolean flag, and if the received value of the Boolean flag is true, executing the one or more functions.

Further, in some embodiments, the functional is implemented as a keyword. In some embodiments, the method further comprises iteratively invoking the interval timer from inside an iterative loop and, if and only if the returned value of the Boolean flag is true, executing a function. Moreover, in some embodiments, the function is a first function, and the method further comprises also invoking a second function from inside the iterative loop and executing the second function each time the second function is called. Further, in some embodiments, the first function is a slow function and the second function is a fast function. In some embodiments, the first function includes a graphical function and the second function includes a calculation operation.

In some embodiments, the interval timer, the stop-watch, the Boolean flag, and the preset time-interval value are respectively a first interval timer, a first stop-watch, a first Boolean flag, and a first preset time-interval value, and the method further comprises implementing a second interval timer, wherein implementing the second interval timer comprises starting and stopping a second stop-watch that is independent of the first stop-watch, setting values for a second Boolean flag that is independent of the first Boolean flag, and using a second preset time-interval value that is independent of the first preset time-interval value.

In accordance with some embodiments, a non-transitory computer-readable medium is encoded with a computer program which, when executed by one or more computer processors, performs a method for executing an interval timer.

In some embodiments, the Boolean flag is a shared atomic Boolean variable.

Moreover, according to some embodiments, a system for executing an interval timer comprises a storage medium for storing a Boolean flag; a chronometer module for measuring an elapsed time and, when invoked for a first time, setting a value of the Boolean flag to false and starting measurement of the elapsed time, and further for setting the value of the Boolean flag to true when the elapsed time reaches a preset time-interval value; and a responder module for returning the value of the Boolean flag whenever the interval timer is invoked, and, if the returned value of the Boolean flag is true, setting the value of the Boolean flag to false and restarting measurement of the elapsed time from zero.

Moreover, according to some embodiments, the chronometer module is also for stopping the measurement of the elapsed time when the elapsed time reaches the preset time-interval value. Further, according to some embodiments, the chronometer module and the responder module operate in different threads.

BRIEF DESCRIPTION OF THE DRAWINGS

The drawings are not necessarily to scale. Instead, emphasis is generally placed upon illustrating the principles of the inventions described herein. It is to be understood that the following detailed description is exemplary and explanatory only and is not restrictive of any invention, as claimed. The accompanying drawings, which are incorporated in and constitute a part of this specification, illustrate several embodiments consistent with the inventions and together with the description, serve to explain the principles of the inventions. In the drawings:

DETAILED DESCRIPTION

The following detailed description refers to the accompanying drawings. Wherever possible, the same reference numbers may be used in the drawings and the following description to refer to the same or similar parts. Also, similarly-named elements may perform similar functions and may be similarly designed. Numerous details are set forth to provide an understanding of the embodiments described herein. In some cases, the embodiments may be practiced without these details. In other instances, well-known techniques and/or components may not be described in detail to avoid obscuring described embodiments. While several exemplary embodiments and features are described herein, modifications, adaptations, and other implementations are possible, without departing from the spirit and scope of the invention. Accordingly, the following detailed description does not limit the invention. Instead, the proper scope of the invention is defined by the appended claims.

According to various embodiments, a program that iteratively performs operations of different speeds may require a multi-rate operation mechanism. A user may include all of the operations in programming code, via, for example, an iterative loop but may execute different operations at different rates. In some embodiments, a multi-rate operation may include a first set of operations that are executed at a higher rate, that is, more often, compared to a second set of operations. In some embodiments, the code performs the slower operations at a lower rate compared to the faster operations. In some other embodiments, the code may perform the operations that require more resources, e.g., more processor time or more memory allocation, at a lower rate compared to the rest of the operations. For example, in some multi-rate programs, the code may perform the fast calculations in every iteration but may perform the slower operations only once in every hundred iterations or once in every few seconds.

Various embodiments implement a multi-rate mechanism by using one or more of the techniques described below in detail. In some embodiments, the multi-rate mechanism includes executing multiple threads and distributing various operations among those threads. In some embodiments, the multi-rate mechanism includes using an interrupt mechanism used by various operations or various threads. In some embodiments, the multi-rate mechanism includes using a timer functional, which uses a multi-threaded mechanism hidden from the user. In some embodiments, the multi-rate mechanism includes an in-loop timer called in each iteration form inside the iterative loop. In some embodiments, the multi-rate mechanism includes a Boolean interval timer called in each iteration. Further, some embodiments use multiple instances of interval timers. In some embodiments, the multi-rate mechanism utilizes global variables, persistent variables, or nested functions, Some embodiments implement a multi-rate mechanism by executing the different set of operations in different threads. In particular, in a first thread, the code executes iterations of the fast operations, e.g., calculations, in a first loop and outputs the results to a second thread. In the second thread, on the other hand, the code executes separate iterations of the slower operations, e.g., a drawing program, in a second loop that receives its input from the results of the first thread. In some multi-threaded embodiments, the program may use a spin-lock mechanism between different threads.

Some multi-threaded embodiments use an interrupt mechanism. In particular, in some embodiments the main operation and a time measurement are performed in two separate threads which are connected via an interrupt mechanism. In certain embodiments, the first thread executes an interrupt handler for performing the slow operations, e.g., the drawing, and also a loop including the fast operations, e.g., the calculations. The second thread, on the other hand, measures the elapsed time since the last slow operation and, if the elapsed time reaches a preset period value, posts an interrupt request. Upon receiving the interrupt request, the interrupt handler in the first thread performs the slow operation, i.e., the drawing. Some embodiments use a semaphore mechanism in a manner similar to the above-described interrupt mechanism.

Some embodiments utilize a timer mechanism. In particular, a user may wish to implement a multi-rate mechanism in a single-threaded manner. Alternatively, in some embodiments, the user programs in a single-threaded environment while the system implements the multi-rate mechanism in a multi-threaded environment that is hidden from the user. In some embodiments, such a single-threaded implementation uses a function call that is performed transparently in a multi-threaded manner. In certain embodiments, the function is a timer( ) type function, which runs in a separate thread independent of the main thread and executes the slower operation, e.g., the drawing, at the desired intervals of time. Exemplary code (2) illustrates one such program in accordance with some embodiments.

Code (2)

```
data=initialize_data( );
myTimer=timer(Period_value, draw(data));
start(myTimer);
   for i=1, loop_count
   % perform calculations here
   updated_data=calculate(data);
   data=updated_data;
end
```

In code (2), myTimer is defined as an instance of a timer( ) functional, included in the MATLAB® technical computing package, which is provided by the MathWorks Inc. As used here, a functional is a function for which the inputs include one or more other functions. The timer( ) functional receives inputs that include a period_value and the draw function. As shown in code (2), myTimer is started outside the main loop. A timer( ) functional, once started, executes its function input (here draw(data)) periodically at the periods defined by its other input (here Period_value). In the main loop following the above calls, the data is updated iteratively. While the main loop updates the data in every iteration, the timer( ) functional executes the drawing function call, which in code (2) is draw (data), once in every one period defined by Period_value. In this example, the value of data is shared between the loop and the drawing function call.

In some embodiments, the instance of a timer( ) functional is executed in a thread that is different from the main thread in which the main loop is executed. In using the timer( ) functional, the user need not know about multi-threaded programming or set up a multi-threaded environment. Instead, the code may call the timer( ) functional in the single-threaded code and the system runs the additional thread automatically and transparently from the user.

Interrupt-driven and timer-driven multi-rate mechanisms introduce their own advantages and challenges. Compared to the no-constraint mechanism exemplified in code (1), for example, both multi-threaded and timer-driven mechanisms reduce the number of times that the slow operation is executed compared to the fast operation. Both mechanisms, on the other hand, may require a multithreaded environment and, in some implementations, the user's knowledge of programming in such an environment. The interrupt driven mechanisms also require user's knowledge of using interrupts.

Moreover, both interrupt-driven and timer-driven mechanisms employ state management techniques. In an interrupt-driven implementation the second thread posts the interrupt based on the elapsed time and independent of the stage of the operation in the first thread. Similarly, in a timer-driven implementation, the timer( ) functional executes the draw( ) function based on its own internal stop-watch, which measures time, and the period_value and independent of the stage of the operations in the first thread. Thus, in these implementations, the calling of the draw( ) function may not necessarily coincide with the end of one data update iteration in the first thread. Therefore, drawing may occur at unpredictable stages of the calculation and based on data for which an update is not yet completed. Moreover, the unpredictable time of the drawing may leave some of the variables created during the calculations of the first thread in a bad state. To address these issues, the first thread may need some additional state management mechanisms and such state management may add to the overhead.

In various embodiments, a single-threaded multi-rate implementation uses an inloop-timer. The inloop-timer is called in each iteration from inside the iterative loop, and determines whether or not to execute the slow operation. An inloop-timer enables a code to include both sets of operations in the same iterative loop within one thread, but execute the lower rate operations only at the intervals determined by the inloop-timer. In some embodiments, the inloop-timer enables the code to skip the execution of the lower rate operation in some iterations, while executing the higher rate operation in every iteration.

In some embodiments, a single-threaded inloop-timer mechanism is implemented using a mechanism for measuring an elapsed time since last execution of the second set of operations. In some embodiments the elapsed time mechanism utilizes an etime( ) function included in the MATLAB® package of The MathWorks Inc. The etime( ) function calculates the elapsed time by finding the difference between two clock times. The code then compares the elapsed time with a preset interval to determine whether to execute the lower rate operation. A high level example of a program using such an etime-driven mechanism is shown in code (3).

Code (3)

```
data=initialize_data( );
last_time=clock( );
  for i=1, loop_count
    % perform calculations here
    updated_data=calculate(data);
    present_time=clock( );
    % check time elpased after last drawing
    if etime(present_time, last_time)≥Interval
      % perform drawing here
      draw(updated_data);
      last_time=present_time;
    end_if
    data=updated_data;
end
```

Code (3) essentially executes a main loop which performs both the fast operations, i.e., the calculations, and the slow operations, i.e., the drawing. In code (3), in each iteration of the main loop, the program saves the clock time of the iteration in the variable present_time. Also, each time a drawing is performed, the program saves the clock time in the variable last_time. After updating data in each iteration, the program checks whether the elapsed time since the last drawing, i.e., the difference between last_time and present_time, has reached a preset time interval value, i.e., Interval. In the example above, the program uses the function etime( ) which measures the time difference between the arguments, present_time and last_time. If the condition is satisfied, the program draws the updated results, and updates the last_time to the present_time. Otherwise, the program skips the drawing step.

The etime( ) mechanism introduces different new aspects compared to previously-discussed implementations. For instance, the etime( ) mechanism of code (3) reduces the number of times that the slow operation is executed compared to the fast operation thereby improving execution time over the no-constraint method exemplified in code (1). Further, because the if statement executes the draw function at predictable stages of the program and based on properly updated data, the etime( ) mechanism of code (3) does not need state management. On the other hand, the etime( ) mechanism of code (3) includes repeating additional operations in each iteration, that is, measuring the clock time, calculating the time difference, and comparing the time difference with the present time interval. The etime( ) mechanism thus introduces some additional overhead that is not present in the above-discussed no-constraint mechanism, interrupt-driven mechanism, or timer( ) functional based mechanism.

In some embodiments, a multi-threaded inloop-timer mechanism in a single-threaded program is implemented using a Boolean interval timer mechanism. An interval timer mechanism may be invoked, that is, called, in each iteration from inside the iterative loop and returns a Boolean value. The main loop executes the lower rate operation if the interval timer returns a true value. An exemplary program utilizing an interval timer is shown in code (4):

Code (4)

```
data=initialize_data(t);
start IntervalTimer( );
  for i=1, loop_count
    % perform calculations here
    updated_data=calculate(data);
```

```
% query IntervalTimer
if IntervalTimer( )
    % perform drawing here
    draw(updated_data);
    resstart IntervalTimer( );
end if
data=updated_data;
end
```

Figure 1:
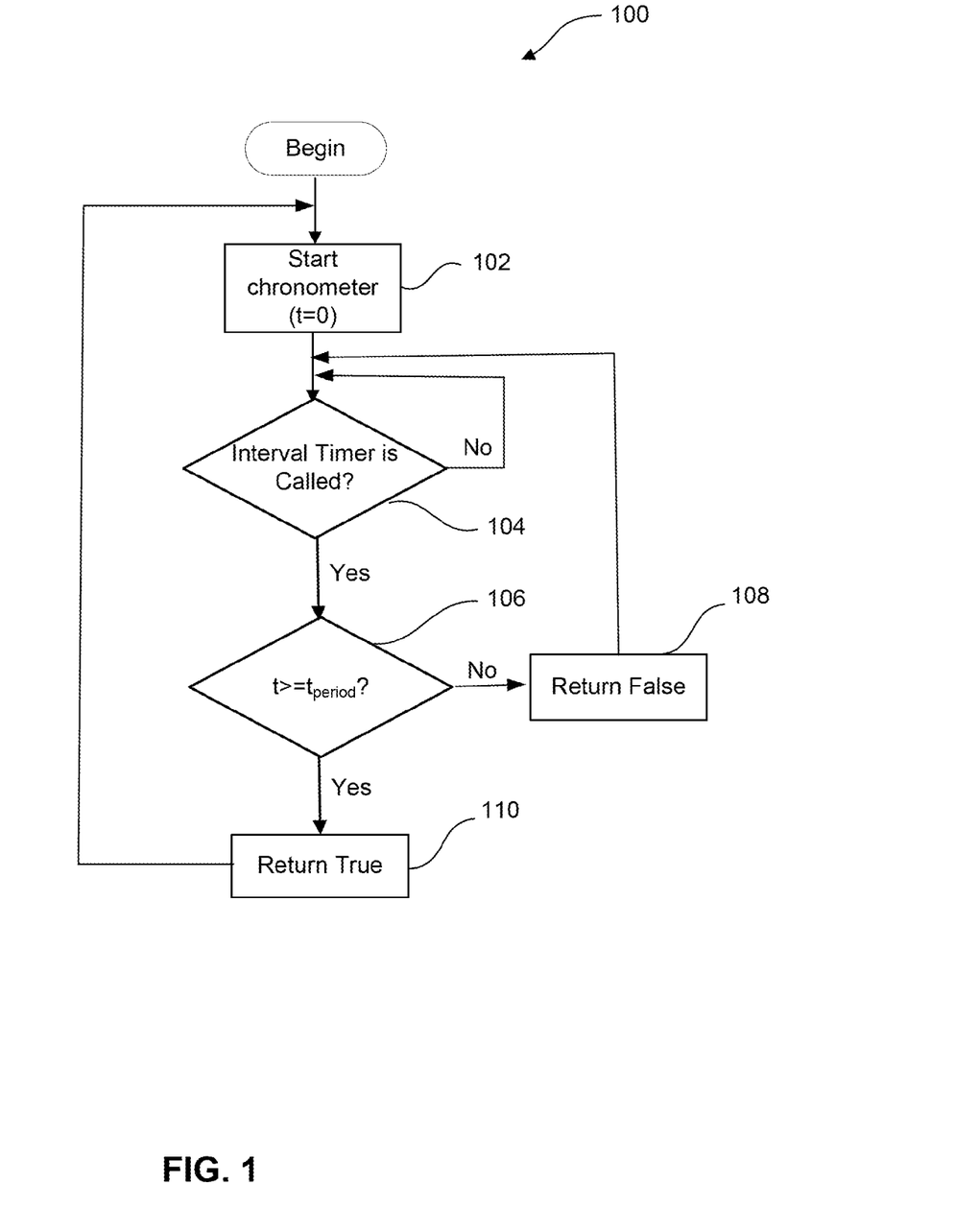
FIG. 1 shows a flowchart for the operation of an interval timer in accordance with some embodiments.

In certain embodiments, the interval timer runs on a thread that is separate from thread in which the main code runs, and returns a true value only if the time elapsed since the last lower rate operation is not less than a preset period of time. FIG. 1 shows a flowchart 100 for the operation of an interval timer in accordance with some embodiments.

In flowchart 100, the elapsed time starts from zero and is measured by, for example, starting a stop-watch for measuring elapsed time (step 102). The interval timer then enters a waiting state in which it waits till the interval timer is called (step 104). When the interval timer is called, it determines whether the elapsed time is less than a preset interval value ($t_{period}$) (step 106). If the answer is no, the interval timer returns a Boolean false value (step 108) and waits for the next call. If the answer to the query is yes, that is, if the elapsed time is equal or greater than the preset interval value, the interval timer returns a Boolean true value (step 110), and returns to setting the elapsed time to zero and restarting the stop-watch (step 102). The interval timer then repeats the above process by waiting for the next call (step 104). In some embodiments, the interval timer starts when a program calls it for the first time, and it ends when the program ends.

The exemplary interval timer implementation shown in code (4) and flowchart 100 reduces unpredictability by causing the lower rate functions to run at predictable stages of the program and based on properly updated data. The interval timer implementation also reduces overhead by performing a Boolean query of a Boolean value in place of calculating time differences and comparing those differences with preset values.

Figure 2:
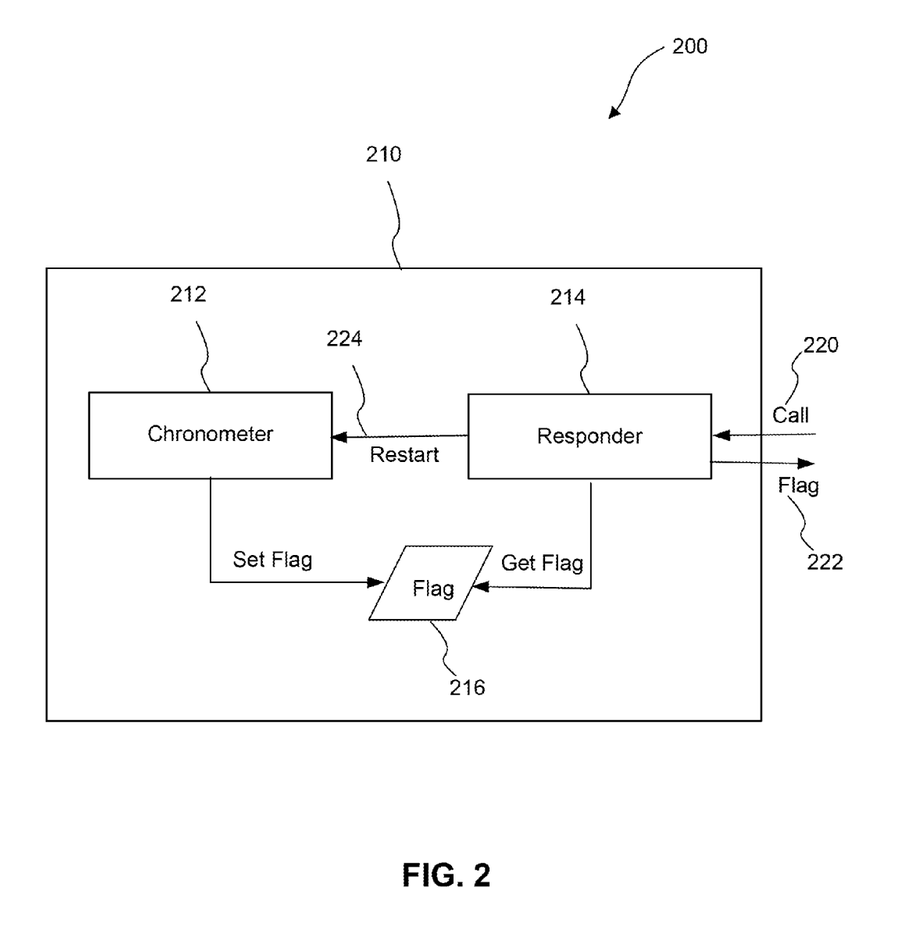
FIG. 2 illustrates a block diagram showing different modules of an interval timer in accordance with certain embodiments.

In some embodiments, the interval timer includes two separate modules, one for responding to a call and one for measuring the time. FIG. 2 illustrates a block diagram 200 showing different modules of an interval timer 210 in accordance with certain embodiments. Interval timer 210 includes two modules, a chronometer module 212 and a responder module 214. Interval timer 210 also stores a Boolean flag 216, which can be set by chronometer module 212 and read by responder 214. In some embodiments, Boolean flag 216 is a shared atomic Boolean variable.

When started or restarted, chronometer module 212 sets the value of Boolean flag 216 to false and also starts measuring the elapsed time from zero using an internal stop-watch. Once the elapsed time reaches a preset interval value, chronometer module 212 sets Boolean flag 216 to true. In some embodiments, chronometer module 212 also stops measuring the elapsed time at this point.

Responder 214 responds to outside calls of interval timer 210. In particular, responder 214 responds to a call 220 issued to interval timer 210 by an outside program such as the main loop of code (4). In response to such a call, responder 214 gets the value of Boolean flag 216 and returns it in a return value 222. Further, if return value 222 is true, responder 214 also issues a restart command 224 to chronometer module 212, causing chronometer module 212 to reset the value of the Boolean flag 216 to false and also to restart measuring the elapsed time from zero.

Figure 3:
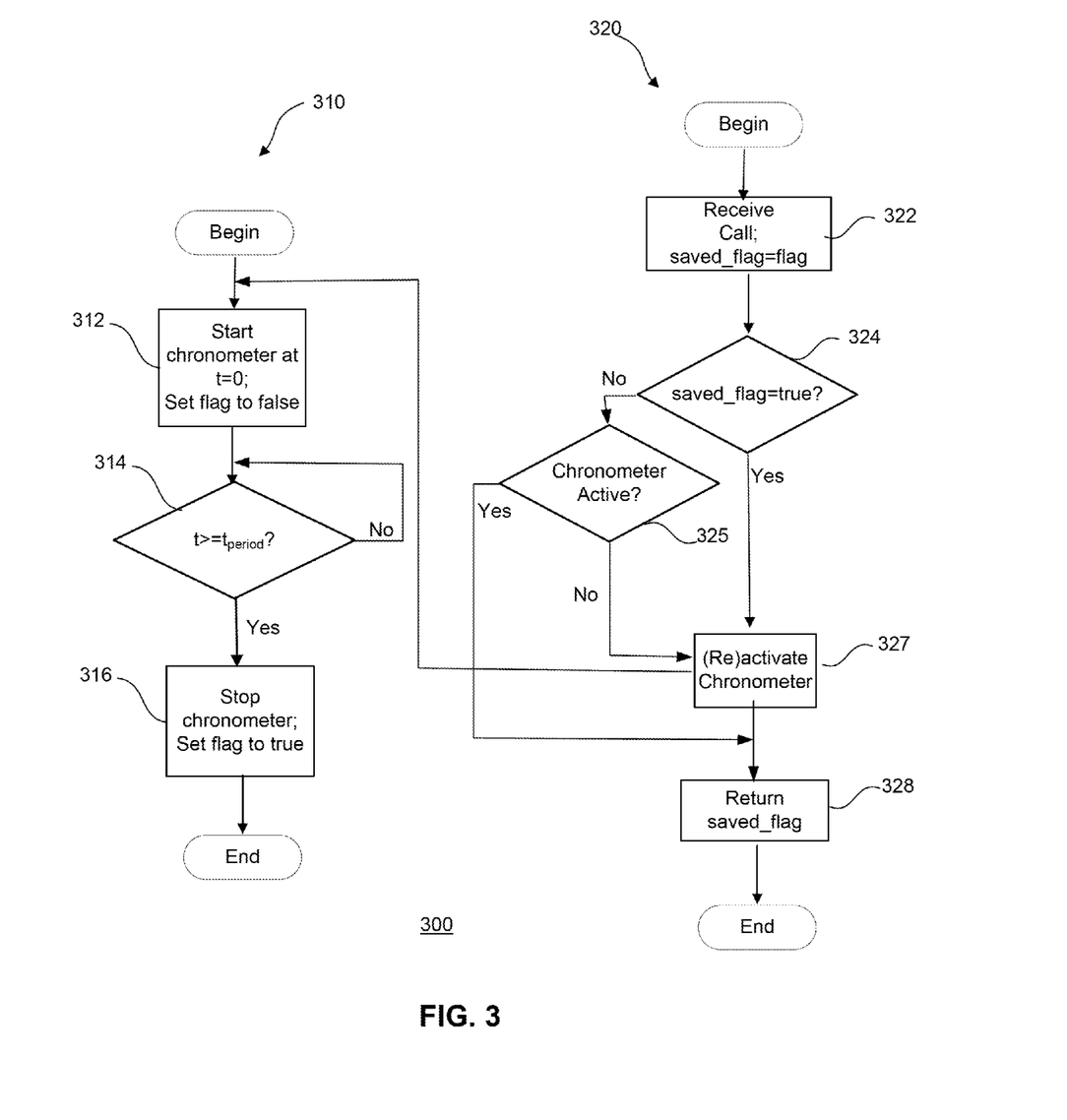
FIG. 3 illustrates flowcharts executed by modules of an interval timer, in accordance with some embodiments.

In some embodiments, chronometer module 212 and responder module 214 of interval timer 210 operate in separate threads. FIG. 3 illustrates a flowchart 300, which includes two sub-flowcharts 310 and 320 executed in two separate threads by two modules, chronometer module 212 and responder 214, in accordance with some embodiments.

To execute sub-flowchart 310, interval timer 210 starts a second thread that is separate from the main thread and is transparent to the user. In the second thread, chronometer module 212 executes the above-discussed operations. In particular, in step 312 an internal stop-watch is started to measure the elapsed time and Boolean flag 216 is set to false. Also the default value of Boolean flag 216 is set to false, before it is changed by chronometer module 212 for the first time. In decision block 314, the chronometer module waits until the elapsed time reaches the preset interval value ($t_{period}$). At that time, the chronometer module sets Boolean flag 216 to true (step 316). In some embodiments, after setting Boolean flag to true, chronometer module 212 also stops the stop-watch from measuring the elapsed time.

In sub-flowchart 320, on the other hand, responder 214 responds to the calls from the main program executed in a main thread. In certain embodiments, when the responder module receives a call to the interval timer from the main loop, the responder module saves the value of the flag in a Boolean variable saved_flag (block 322). The responder module then checks whether the Boolean flag is true (query block 324). If the Boolean flag is false, responder module also checks whether the chronometer module has already been activated (query block 325). If the query from bock 325 reveals that the chronometer module has not been activated, the responder module activates the chronometer module by initiating the sub-flowchart 310 (block 327).

Similarly, if in query block 324 the responder module determines that the value of the flag is true, the responder module reactivates the chronometer module by initiating the sub-flowchart 310 (block 327).

At the end of the sub-flowchart 320, the responder module returns the value of saved_flag (block 328).

The multi-threaded implementations shown in FIGS. 2 and 3 perform the measurement of the elapsed time outside the iterations in the main thread and inside a separate chronometer thread. Further, the measurement of the elapsed time continues till the elapsed time reaches the preset time interval, and will not resume till the interval timer is called next. These exemplary embodiments take advantage of the benefits of multi-threaded systems. The user, however, need not know multi-threaded programming, as the chronometer thread starts and runs hidden from the user. Further, as shown earlier, the interval timer mechanism is predictable and does not need state management. Similarly, the interval timer mechanism satisfies locality of reference for the data.

Various embodiments implement the interval timer in different programming forms. Some embodiments use object oriented implementations, in which one or more objects perform functions including measuring time and setting Boolean flags. Code (5) shows one such implementation of the interval timer in accordance with one embodiment.

```
Code (5)
ui=hg2utils.UpdateInterval(Period_value);
data=initialize_data( );
    for i=1, loop_count
    % perform calculations here
    updated_data=calculate(data);
    if ui.Elapsed
        ui.Elapsed=false;
        % perform graphics here
        draw(updated_data);
    end
``` data=updated_data;
end

Code (5) uses UpdateInterval, which is a class that implements the interval timer. UpdateInterval is defined in hg2utils, a name space included in the MATLAB® package provided by The MathWorks Inc.

Code (5) instantiates an object ui as an instance of UpdateInterval. Upon instantiating ui, the interval timer mechanism in the UpdateInterval is started. Further, the UpdateInterval class defines a Boolean variable member, Elapsed, which plays the role of the Boolean flag explained above. The object ui sets the value of Elapsed to true after the elapsed time reaches the value Period_value. Period_value is a value which is input by the program when instantiating ui. In various embodiments, Period_value determines the value of the period after which the lower rate operation is executed. In some embodiments, Period_value is entered by the user into the program. In some embodiments, Period_value is a fixed value defined by some section of the program. In some embodiments, Period_value is in a unit of time, such as seconds, milliseconds, or microseconds.

The value of ui.Elapsed is queried in each iteration by the if block in the main loop. When the interval-time mechanism sets ui.Elapsed to true, the if block is executed, that is, ui.Elapsed is reset to false and the lower rate operation is performed.

In some embodiments, the interval timer is implemented as a MATLAB® keyword. Code (6) shows the use of a keyword implementation of the interval timer in accordance with certain embodiments.

Code (6)
data=initialize_data( );
  for i=1, loop_count
  % perform calculations here
  updated_data=calculate(data);
  interval (Period_value);
    % perform graphics here
    draw(updated_data);
  end
  data=updated_data;
end In code (6), a keyword "interval( )", defined by the MATLAB® package, performs the role of the interval timer described above. In particular, the first time that the keyword interval( ) is called, an interval timer is instantiated and a sub-flowchart 310 is executed in a separate thread.

Further, each time that the keyword interval( ) is called, interval( ) returns a Boolean flag as described in relation to system 200 and sub-flowchart 320. The keyword interval( ) returns true only if its internal stop-watch has reached Period_value. Further, the block starting with keyword interval( ) behaves similar to an if block: the block is executed only when interval( ) returns true. Also, whenever interval( ) returns true, it resets the value of the Boolean flag to false and restarts its internal stop-watch from zero.

When programming code (5), the programmer needs to know about the public interface of the class UpdateInterval and also must reset the Elapsed flag to false whenever the if block is executed. When programming code (6), on the other hand, the programmer need only know how to call the keyword interval( ) and also use it as an if block.

In some embodiments, the interval timer is implemented in a C++ object-oriented environment. Code (7) shows one such exemplary implementation.

Code (7)
data=initialize_data( );
hgutils::WaitThread thread;
// Set the timeout
thread.setTimeout(time_out);
thread.start( );
while (i<loop_count){
  // perform calculations here
  updated_data=calculate(data);
  if thread.isElpased( )){
  thread.start( );
  // perform graphics here
  draw(updated_data);
  }
  data=updated_data;
}

In code (7), the class WaitThread, included in the namespace hgutils of MATLAB®, implements an interval timer in accordance with some embodiments. In particular, code (7) instantiates a WaitThread object called "thread". WaitThread defines an internal stop-watch and includes a public Boolean variable, "isElapsed", similar to the Boolean flag of the interval timer. Code (7) calls the method setTimeout( ) of class WaitThread with an argument "time_out". This method call sets the value of a timeout variable in the object thread, in a manner similar to $t_{period}$ in FIG. 3. Code (7) then calls the method start( ) of the object thread, which starts the internal stop-watch from zero and sets the Boolean variable isElapsed to false. As soon as the internal stop-watch reaches the value of time_out, it stops and an internal function of the object thread sets isElapsed to true. Inside the loop, each iteration queries the value of the "isElapsed" at the start of an if block. Whenever the query returns a true value, the if block is executed. In particular, the if block calls a method thread.start( ) that restarts the stop-watch and resets the flag to false. Moreover, the if block executes the lower rate operation.

Multiple independent instances of the interval timer can be utilized in the same program to run several lower rate operations at different rates. Code (8) shows one exemplary embodiment of such a program using multiple independent timers:

Code (8)
ui1=hg2utils.UpdateInterval(Period_value1);
ui2=hg2utils.UpdateInterval(Period_value2);
data=initialize_data( );
  for i=1, loop_count
  % perform calculations here
  updated_data=calculate(data);
  if ui1.Elapsed
    ui1.Elapsed=false;
    % perform graphics here every period_value1
    draw(updated_data);
  end
  if ui2.Elapsed
    ui2.Elapsed=false;
    % perform some other operation here every period_value2
    operation2(updated_data);
  end
  data=updated_data;
end Code (8) uses two instances of the UpdateInterval class described in relation to code (5). Code (8) instantiates the two instances, ui1 and ui2, each with its own period value (Period_value1, Period_value2). The period values are independent from each other and can have the same or different values. Inside the main loop, each iteration checks whether the time has elapsed for each of the interval timers ui1 and ui2. The Boolean variables ui1.Elapsed and ui2.Elapsed are independent from each other, and their values are set to true independently, and based on the internal stop-watch in the corresponding interval timer. If either of these flags are true, code (8) executes the corresponding lower rate operation (here draw( ) and operation2( )). Therefore, not only the lower rate operations (draw( ) and operation2( )) are executed at rates that are different from the higher rate operation (here calculate( )), but also the lower rate operations can be executed at rates that are different from each other.

Certain embodiments implement a multi-rate mechanism using global variables. Code (9) illustrates one example of one such exemplary embodiment.

Code (9)
```
myTimer=timer(period_value,@setGlobal)
start(myTimer)
global timerReady
data=initialize_data( )
   for i=1, loop_count
   % perform calculations here
   updated_data=calculate(data);
   if timerReady
      timerReady=false;
      % perform drawing here
      draw(updated_data);
      data=updated_data;
   end
end
stop(myTimer)
delete(myTimer)
end
function setGlobal(~,~)
global timerReady
timerReady=true;
end
```

Code (9) uses the timer( ) functional, which was explained in relation to code (2). The timer( ) functional in code (9) periodically executes the function setGlobal( ) The function setGlobal( ) whenever called, sets the value of a global variable, timerReady, to true. Inside the main loop, each iteration checks the value of timerReady and if that value is true, resets it to false and also performs the lower rate operation, here draw( ). Using such a global variable in combination with the timer( ) functional thus implements a multi-rate mechanism. However, because the global variable can be accessed and changed by any part of the code, a programmer using a global variable should be aware of race conditions and make sure that different parts of the code do not conflict with each other.

In some embodiments, instead of using a global variable, the multi-rate mechanism uses a persistent variable. For example, in some embodiments, a function CheckInterval( ) uses a persistent variable lastTime. Being defined in CheckInterval( ), lastTime has a scope that is only within CheckInterval( ). On the other hand, being persistent, lastTime preserves its value, even after returning from CheckInterval( ). CheckInterval( ) sets the value of a Boolean flag to true, if the difference between lastTime and the present clock time is equal or greater than a period_value. Further, whenever the flag is set to true, CheckInterval( ) updates the value of lastTime to the present clock time.

Certain embodiments implement a multi-rate mechanism using nested functions. Code (10) illustrates one example of such an embodiment.

Code (10)
```
myTimer=timer(period_value, @ settimerReady)
start(myTimer)
timerReady=false
function settimerReady(~,~)
   timerReady=true
end
data=initialize_data( )
   for i=1, loop_count
   % perform calculations here
   updated_data=calculate(data);
   if timerReady
      timerReady=false;
      % perform drawing here
      draw(updated_data);
      data=updated_data;
   end
end
stop(myTimer)
delete(myTimer)
end
```

Code (10), similar to code (9), uses a timer( ) functional to execute a function setTimerReady( ) at periodic times. Further, similar to code (9), setTimerReady( ) sets the value of a flag, timerReady, to true. The main loop, in each iteration, checks the value of timerReady and, if that value is true, executes the lower rate function draw( ) Code (10) is different from code (9) in that timerReady is not defined as a global variable. Instead, due to the placement of the function setTimerReady( ) compared to the main loop, the variable timerReady is shared between setTimerReady and the main loop, and can thus be accessed and modified by each of setTimerReady and the main loop. Thus, the nested function implementation of code (10) implements a multi-rate mechanism while avoiding the use of global variable of code (9). In implementing such a nested function mechanism, however, a user needs to know how to use nested function in a way that a non-global variable is shared between different parts of the code.

Figure 4:
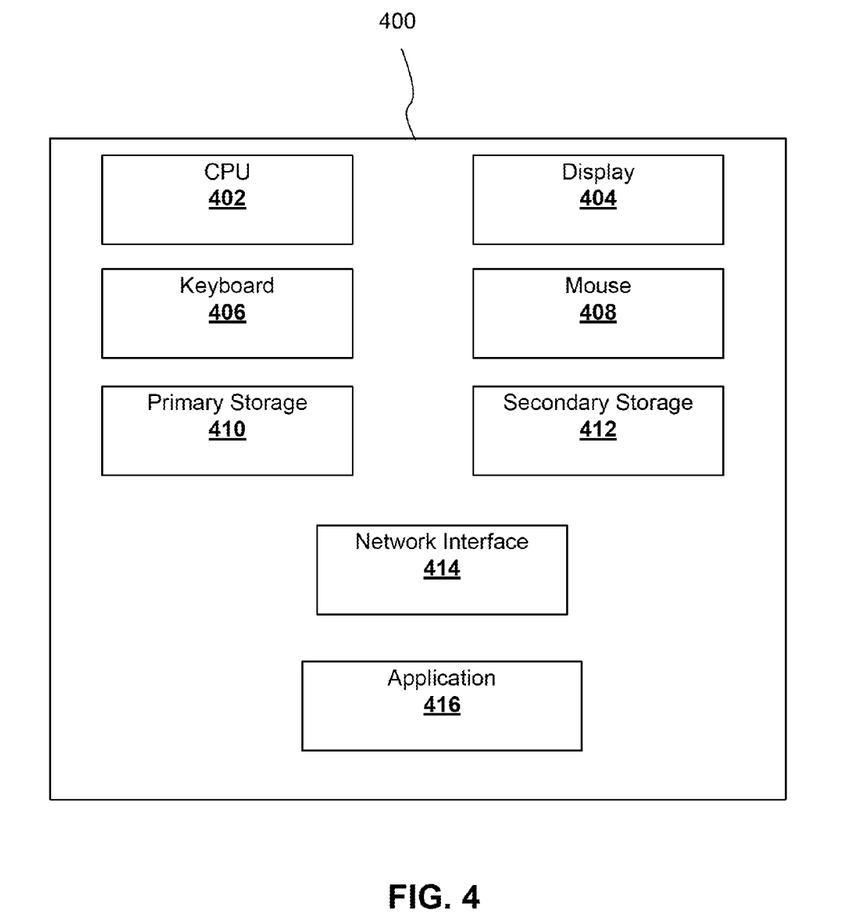
FIG. 4 illustrates a block diagram of an electronic device in accordance with some embodiments.

Various embodiments can be implemented by one or more electronic devices. FIG. 4 illustrates a block diagram of an electronic device 400 in accordance with some embodiments. Electronic device 400 can be implemented by one or more of various technologies, such as personal computers (PCs), laptop computers, workstations, personal digital assistants (PDAs), Internet appliances, cellular telephones, wireless devices, and the like.

In FIG. 4, electronic device 400 includes a processing unit 402 for executing machine-executable instructions and a display device 404. Display device 404 enables electronic device 400 to communicate directly with a user through a visual display. Electronic device 400 further includes one or more input devices, such as a keyboard 406 and a mouse 408. Other potential input devices include a stylus, a trackball, a joystick, a touch pad, a touch screen, and the like. Electronic device 400 also includes a primary storage device 410 and a secondary storage device 412 for storing data and instructions. Primary and secondary storage devices 410 and 412 can include, but are not limited to, such technologies as floppy drive, hard drive, tape drive, optical drive, read only memory (ROM), random access memory (RAM), and the like. Applications such as browsers, JAVA virtual machines, C compilers, and other utilities and applications can reside on one or both of primary and secondary storage devices 410 and 412. Electronic device 400 can also include a network interface 414 for communicating with one or more electronic devices external to electronic device 400. The various components of electronic device 400 can be operatively connected through wired or wireless connections. Modems and Ethernet cards, are examples of network interfaces 414 for establishing a connection with an external electronic device or network. processing unit 402 has either internally, or externally, attached thereto one or more of the aforementioned components. Interactive programming and/or development applications 416, such as MATLAB, Simulink®, or Labview® can be installed and operated on electronic device 400.

It should be noted that electronic device 400 is merely representative of a structure for implementing various embodiments of the present disclosure. However, one of ordinary skill in the art will appreciate that the present disclosure is not limited in implementation to the described electronic device 400. Other implementations can be utilized in various embodiments, including an implementation based partially or entirely on embedded code, where no user inputs or display devices are necessary. In such an instance, a processor can communicate directly with another processor, or with other devices.

It should further be noted that the present disclosure makes use of MATLAB as a representative modeling application that can make use of various features of the present disclosure. However, the present disclosure is by no means limited to use with MATLAB, or even interactive programming applications. The present disclosure, and its equivalents as understood by those of ordinary skill in the art, can be utilized in conjunction with interactive applications, compilers, and other code-generating mechanisms.

In various embodiments, one of more of the disclosed modules are implemented via one or more processors executing software programs for performing the functionality of the corresponding modules. In some embodiments, one or more of the disclosed modules are implemented via one or more hardware modules executing firmware for performing the functionality of the corresponding modules. In various embodiments, one or more of the disclosed modules or disclosed storage mediums are internal or external to the disclosed systems. In some embodiments, one or more of the disclosed modules or storage media are implemented via a computing "cloud", to which the disclosed system connects via an internet and accordingly uses the external module or storage medium. In some embodiments, the disclosed storage media for storing information include non-transitory computer-readable media, such as a CD-ROM, a computer storage, or a flash memory. Further, in various embodiments, one or more non-transitory computer-readable media store information or software programs executed by various modules or implementing various disclosed methods.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the invention is not limited to the above-described embodiments, but instead is defined by the appended claims in light of their full scope of equivalents.

The invention claimed is:

1. A method for implementing a multi-threaded multi-rate mechanism performed by one or more computer processors, comprising:
   starting an interval timer using a main program running on a first thread, by the one or more computer processors, the interval timer comprising:
      a second thread that obtains a value for a preset time-interval from the main program,
         starts a stop-watch, and
         initializes a shared variable indicating completion of the preset time-interval;
   setting the shared variable indicating completion of the preset time-interval by the one or more computer processors, using the second thread, when the stop-watch reaches the value of the preset time-interval; and
   implementing, by the one or more computer processors, a multi-rate mechanism that
      invokes the interval timer using the main program to determine completion of the preset time-interval based on the shared variable and reactivate the second thread, and to restart the stop-watch and reset the shared variable using the second thread, and
      returns to the main program upon invocation a value indicating completion of the preset time-interval.

2. The method of claim 1 further comprising the second thread stopping the stop-watch when the stop-watch reaches the preset time-interval value.

3. The method of claim 1, implementing the multi-rate mechanism further comprising executing a functional by the main program, an argument of the functional comprising one or more functions, and wherein executing the functional comprises the main program executing the one or more functions upon return of the value indicating completion.

4. The method of claim 3, wherein the functional is implemented as a keyword.

5. The method of claim 1 wherein the multi-rate mechanism comprises an iterative loop, the main program invoking the interval timer from inside the iterative loop and executing a function upon return of the value indicating completion.

6. The method of claim 5, wherein the function comprises a first function, the main program invokes a second function from inside the iterative loop, and the second function generates data for the first function and executes each iteration of the iterative loop.

7. The method of claim 1, wherein the interval timer, the stop-watch, the value of the present time-interval, and the shared variable indicating completion of the preset time-interval are respectively a first interval timer, a first stop-watch, a first preset time-interval value, and a first shared variable indicating completion of a first preset time-interval, the method further comprising implementing a second interval timer that is independent of the first interval timer, wherein implementing the second interval timer comprises starting and stopping a second stop-watch that is independent of the first stop-watch, setting a second shared variable indicating completion of a second preset time-interval that is independent of the first shared variable, and using a second preset time-interval value that is independent of the first preset time-interval value.

8. A non-transitory computer-readable medium encoded with a computer program which, when executed by one or more computer processors, performs a method for implementing a multi-threaded multi-rate mechanism comprising:
   starting an interval timer using a main program running on a first thread, the interval timer comprising:
      a second thread that
         obtains a value for a preset time-interval from the main program,
         starts a stop-watch, and initializes a shared variable indicating completion of the preset time-interval;
setting the shared variable indicating completion of the preset time-interval, using the second thread, when the stop-watch reaches the value of the preset time-interval; and
implementing a multi-rate mechanism by
invoking the interval timer using the main program to determine completion of the preset time-interval based on the shared variable and reactivate the second thread, and to restart the stop-watch and reset the shared variable using the second thread, and
returning to the main program upon invocation a value indicating completion of the preset time-interval.

9. The non-transitory computer-readable medium of claim 8, wherein the method further comprises receiving the value of the preset time-interval by the main program.

10. The non-transitory computer-readable medium of claim 8, implementing the multi-rate mechanism further comprising executing a functional by the main program, an argument of the functional comprising one or more functions, and wherein executing the functional comprises the main program executing the one or more functions upon return of the value indicating completion.

11. The non-transitory computer-readable medium of claim 10, wherein the functional is implemented as a keyword.

12. The non-transitory computer-readable medium of claim 8, wherein the interval timer, the stop-watch, the value of the preset time-interval, and the shared variable indicating completion of the preset time-interval are respectively a first interval timer, a first stop-watch, a first preset time-interval value, and a first shared variable indicating completion of a first preset time-interval, and wherein the method further comprises implementing a second interval timer that is independent of the first interval timer, wherein implementing the second interval timer comprises starting and stopping a second stop-watch that is independent of the first stop-watch, setting a second shared variable indicating completion of a second preset time-interval that is independent of the first shared variable, and using a second preset time-interval value that is independent from the first preset time-interval value.

13. The non-transitory computer-readable medium of claim 8, wherein the shared variable is a shared atomic Boolean variable.

14. A system for implementing a multi-threaded multi-rate mechanism comprising:
a storage medium for storing a shared variable indicating completion of a preset time-interval;
a multi-rate mechanism comprising a main program running on a first thread that invokes an interval timer, the interval timer comprising:
a chronometer that measures an elapsed time using a second thread, measurement comprising:
resetting the shared variable indicating completion of the preset time-interval and starting measurement of the elapsed time when reactivated by a responder, and
setting the shared variable indicating completion of the preset time-interval when the elapsed time reaches a preset time-interval value; and
wherein the responder in response to the main program invoking the interval timer:
determines completion of the preset time-interval based on the shared variable and reactivates the chronometer, and
returns to the main program a value indicating completion of the preset time-interval.

15. The system of claim 14, wherein the chronometer stops measurement of the elapsed time when the elapsed time reaches the preset time-interval value.

16. The system of claim 14, wherein the multi-rate mechanism executes a functional using the main program, an argument of the functional comprising one or more functions, and wherein executing the functional comprises the main program executing the one or more functions upon return of the value indicating completion.

17. A system for implementing a multi-threaded multi-rate mechanism in a program, comprising:
one or more processors; and
a non-transitory memory containing instructions that, when executed by the one or more processors, cause the system to perform operations comprising:
receiving a main program comprising a second function;
executing the main program to create a main thread;
creating an interval timer using the main thread, the interval timer comprising a chronometer that uses a second thread to determine when a preset time-interval has elapsed, and a responder that uses a first thread to receive calls from the main thread, to determine completion of the preset time-interval, reactivate the chronometer, and to return a value indicating completion of the preset time-interval; and
implementing the multi-threaded multi-rate mechanism using the main thread, implementation comprising invoking the interval timer, receiving the value indicating completion of the preset time-interval from the interval timer, and executing the second function based on the received value indicating completion of the preset time-interval.

18. The system of claim 17, wherein the second thread is transparent to a user of the system.

* * * * *